United States Patent

Wang et al.

(10) Patent No.: US 8,605,608 B2
(45) Date of Patent: Dec. 10, 2013

(54) NETWORK BUFFER

(75) Inventors: Cheng-Hua Wang, Bedford, NH (US); Huiling Gong, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 461 days.

(21) Appl. No.: 12/687,188

(22) Filed: Jan. 14, 2010

(65) Prior Publication Data

US 2011/0170428 A1    Jul. 14, 2011

(51) Int. Cl.
  *G01R 31/08* (2006.01)
  *H04L 12/26* (2006.01)

(52) U.S. Cl.
  USPC .................. 370/252; 370/238; 370/255

(58) Field of Classification Search
  USPC .......................... 370/252, 238, 255
  See application file for complete search history.

(56) References Cited

U.S. PATENT DOCUMENTS

| | | | |
|---|---|---|---|
| 7,454,428 B2 | 11/2008 | Wang et al. | |
| 7,688,739 B2 * | 3/2010 | Frei et al. | 370/238 |
| 7,953,548 B2 * | 5/2011 | Vengroff et al. | 701/425 |
| 8,073,720 B2 * | 12/2011 | Egner et al. | 705/7.11 |
| 2007/0073897 A1 * | 3/2007 | Sharifzadeh et al. | 709/238 |
| 2007/0130133 A1 | 6/2007 | Lee et al. | |
| 2007/0280199 A1 * | 12/2007 | Rong | 370/351 |
| 2009/0040931 A1 * | 2/2009 | Bast et al. | 370/238 |
| 2009/0063516 A1 | 3/2009 | Wang et al. | |
| 2010/0142408 A1 * | 6/2010 | Hajiaghayi | 370/255 |
| 2010/0268447 A1 * | 10/2010 | Griffiths | 701/200 |

OTHER PUBLICATIONS

Goemans et al., A General Approximation Technique for Constrained Forest Problems, Apr. 1995, vol. 24, No. 2, pp. 296-317.*

* cited by examiner

*Primary Examiner* — Mark Rinehart
*Assistant Examiner* — Angel Brockman
(74) *Attorney, Agent, or Firm* — Kraguljac Law Group, LLC

(57) ABSTRACT

Systems, methods, and other embodiments associated with generating a network buffer are provided. A network data model is input that includes a set of network elements, such as nodes and links, and respective costs associated with respective network elements. A center network element around which to generate the network buffer and an offset cost to define a boundary of the network buffer are also input. A network buffer is generated by determining a buffer coverage and cost. The network buffer is made up of a set of buffer network elements located within the offset cost with respect to the center network element. The cost for each buffer network element is determined as the cost associated with travelling a path with minimum cost from the center network element to the corresponding buffer network element. The buffer coverage and costs are output for subsequent analysis.

20 Claims, 6 Drawing Sheets

NETWORK BUFFER

BACKGROUND

Many applications in Geographic Information Systems (GIS), Social Sciences, and Life Sciences are modeled as networks. A common analysis performed on network models is to generate a buffer representing a region that is equi-distant to certain network elements. Many approaches have been implemented on geographic data to generate geographic buffers around certain geographic features. These approaches typically represent a buffer as a circle or polygon that describes a region around a given geographic feature based on spatial proximity to the geographic feature. In network applications, objects of interest have constrained motion, that is, they can only traverse along nodes and links of the network. For these applications, spatial representation may not accurately represent the buffer zone in terms of network distance (often associated with the concept of cost) with respect to the geographic feature.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

In many applications, including the Oracle Network Data Model (ONDM), objects and capabilities are modeled as nodes and links in a network. The network model contains logical information such as connectivity relationships among nodes, directions of links, and costs associated with nodes and links. With this logical network information, the user can analyze a network and answer questions, many of them related to path computing and tracing. For example, for a biochemical pathway, the user can find all possible reaction paths between two chemical compounds. For a road network, the user can find the shortest (distance) or fastest (travel time) path between two cities, or the closest hotel to a specific airport. For a social network, the user can find a group of people having a specific relationship to a given individual.

Figure 1:
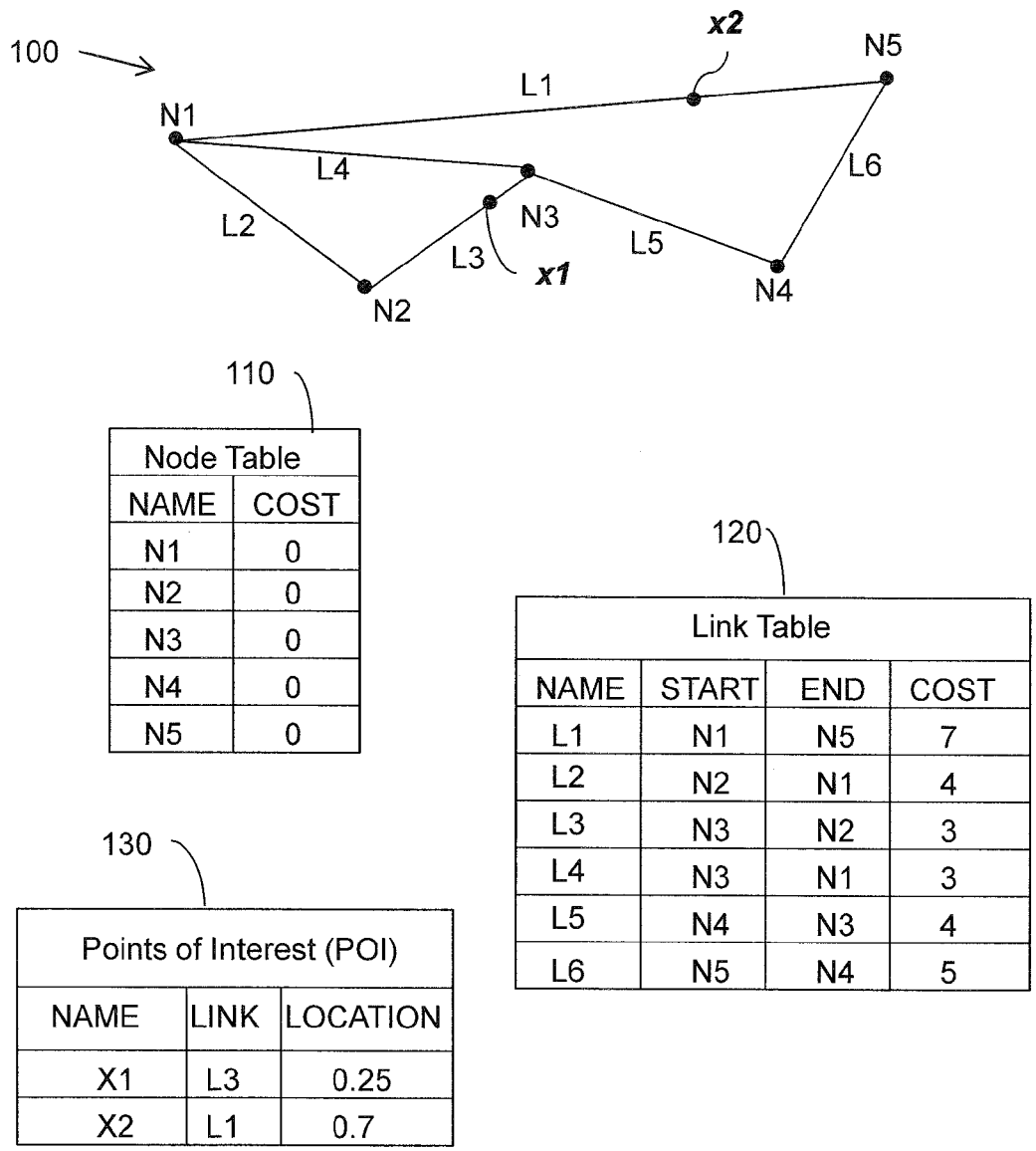
FIG. 1 illustrates a schematic diagram of an example embodiment of a network data model.

FIG. 1 illustrates an example embodiment of a network data model 100. For the purposes of this description, the network data model represents a network of roads (represented as links) connecting intersections (represented as nodes). The network is represented in memory as a node table and a link table. The network data model may also include schema objects including metadata and one or more application programming interfaces (API) for creating, managing, and analyzing networks. These components are not shown for the sake of simplicity.

The node table, which is illustrated in simplified form in FIG. 1, includes a list of nodes in the network (nodes N1-N5) and a cost associated with the node. A cost associated with a node may be, for example, a toll or time delay associated with passing through the node. The node table may also include hierarchical information (not shown) that relates a node to an overall hierarchy and category information (not shown) that expresses a type or category of the node (i.e, a four way intersection with stop signs, a traffic light, a gas station, and so on).

The link table, which is illustrated in FIG. 1 in simplified form, includes a list of links (L1-L6) connecting nodes in the network. The links shown in FIG. 1 are directional, meaning that they may be travelled in only a single direction, such as a one way street. In other embodiments, links may be bi-directional or individually designated as directional or bi-directional. The link table lists the link, the nodes connected by the link (the order of the nodes may indicate the direction in which the link may be travelled), and a cost associated with traveling the link. The cost may be, for example, an estimated time it will take to drive the link or a geographic distance covered by the link. The link table may also include category information (not shown) that expresses a type or category that has been assigned to the link. In a network data model, a "reachable" node is any node that can be reached from a given node. A "reaching" node is a node that can reach the given node. If links are directional, a reaching node for a given node may not be reachable by the given node.

The network data model may also include one or more points of interest (POIs) that may not be nodes in the network but may have importance for analysis purposes. POIs might include restaurants, gas stations, tourist attractions, rest stops, and so on. In the example shown in FIG. 1, POIs are stored in a separate POI table. The location of a POI is expressed as a percentage of travel along a given link. For example, a POI "x1" is located on link L3 at a point that is 25% of the distance between nodes N3 and N2. Additional information about POIs may also be stored, such as a category that can be used to filter POIs during analysis. In some embodiments, a POI may not lie directly on a link. In this case, the POI may be projected onto a nearby link to provide an approximate location for analysis purposes or analysis may be performed on a most proximate node.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between 2 or more logical and/or physical entities.

"Logic", as used herein, includes but is not limited to hardware, firmware, software stored as computer executable instructions on a computer-readable medium or in execution on a computer, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL (structured query language), an OQL (object query language), a natural language, and so on.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 2:
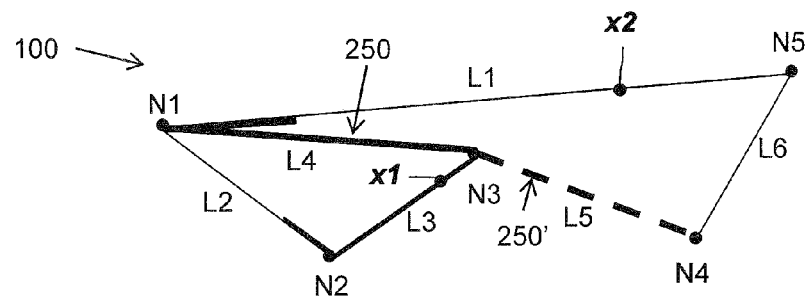
FIG. 2 illustrates a schematic diagram of an example embodiment of data structures associated with a network buffer for the network data model of FIG. 1.
Figure 2:
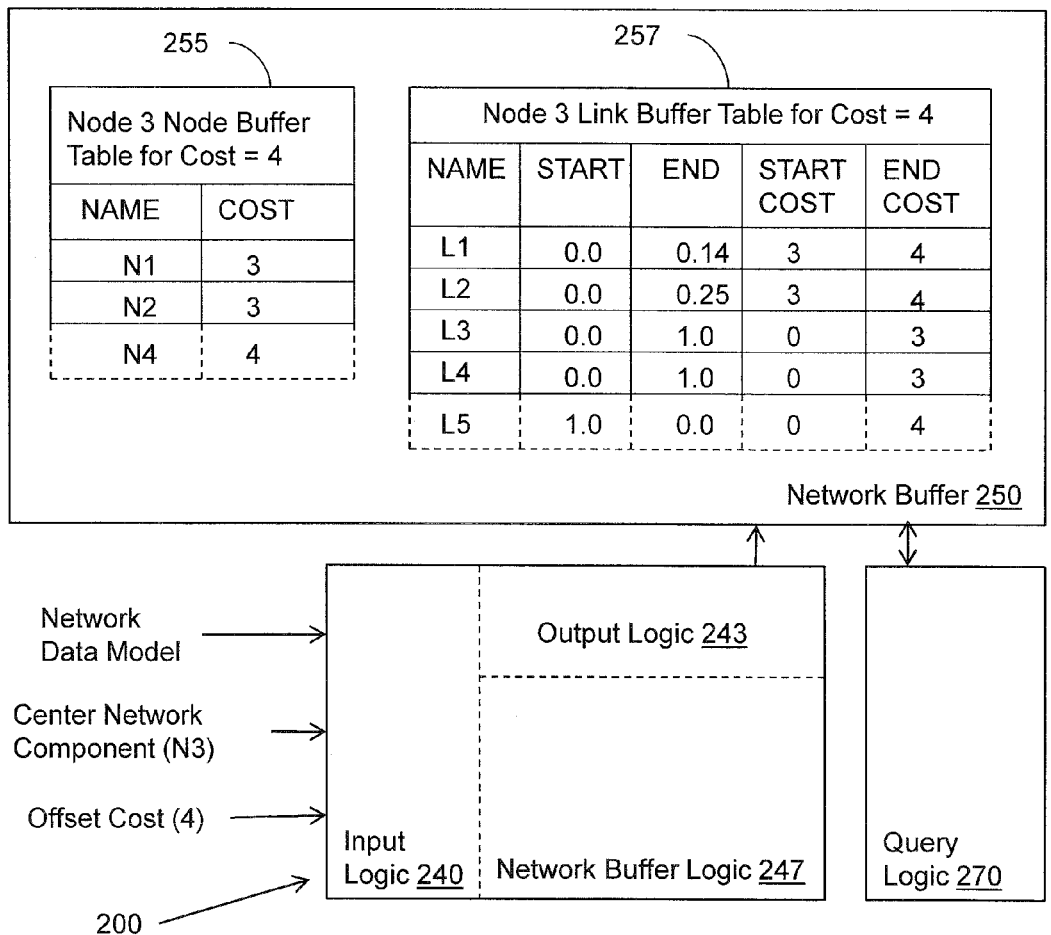

FIG. 2 illustrates an example embodiment of a system 200 that generates a network buffer. A network buffer is a set of network elements that fall within a given offset cost with respect to given buffer center(s). A buffer center is a point on the network, which can be a node or point along a link. For the example shown in FIG. 2, a network buffer is to be generated with respect to Node 3 having a cost offset of 4. To generate the network buffer, an input logic 240 receives a network data model, a center network element (Node 3), and an offset cost (4) that will define a boundary of the network buffer. For the purposes of illustration, the network data model received by the input logic is the network data model 100 of FIG. 1.

In FIG. 2 the network buffer for Node 3 with offset cost 4 when links are directional is shown in heavy line and is indicated generally by 250. The network buffer 250 can be seen to include Nodes 1 and 3. Referring to the link table 120 in FIG. 1, Links 3 and 4 connect Node 3 to Nodes 2 and 1, respectively, with a cost of 3. Thus, Nodes 1 and 3 are included in the network buffer because they can be reached by or can reach Node 3 with a cost of no more than 4. Node 5 is outside of the network buffer because the cost to reach Node 5 from Node 3 is the cost of Link 4 (3) plus the cost of Node 1 (0) plus the cost of Link 1 (7), or 10. Due to the direction of links, Node 3 cannot be reached by Node 5. The network buffer 250 also includes the whole of links 3 and 4 and parts of Links 1 and 2. The parts of Links 1 and 2 that are included in the buffer can be reached with a cost of 1 from Nodes 1 and 2, respectively. Since Nodes 1 and 2 have a cost of 3 with respect to Node 3, the parts of Links 1 and 2 in the network buffer can be reached from Node 3 by incurring the additional cost of 1 to reach the total offset cost of 4.

The network buffer for Node 3 with offset cost 4 when links are bi-directional includes both the network buffer in heavy line 250 as well as Link 5 and Node 4, shown in dashed line and indicated generally by 250'. Link 5 and Node 4 are included because when the links are bidirectional, Node 3 can reach or be reached by Node 4 with a cost of 4 (the cost of Link 5 as specified in link table 120, FIG. 1).

A network buffer logic 247 determines a network buffer that includes a network buffer coverage and a cost for each network element that is part of the network buffer coverage. The buffer coverage is determined as a set of buffer network elements located within the offset cost with respect to the center network element. In the illustrated example, the buffer network elements are Nodes 1 and 2 and Links 1-4 when links are directional. The buffer network elements are Nodes 1, 2, and 5 and Links 1-5 when the links are bi-directional.

The network buffer logic 247 determines a respective cost associated with travelling between respective buffer network elements and the center network element on a path constrained to buffer network elements. In the illustrated example, the cost associated with Nodes 1 and 2 is 3, which is the minimum cost to travel to these nodes from Node 3, the center network element for the buffer, as determined from the network data model 100 (FIG. 1). Likewise, the cost of Node 4 is 4, which is the cost to travel to Node 3 from Node 4.

The respective cost of links is determined as the cost to travel on the link between nodes in the network buffer. Thus, Links 3 and 4, which are wholly included in the network buffer, have a cost of 3 as determined from the network data model (FIG. 1). Link 5 has a cost of 4, also determined from the network data model. Portions of Links 1 and 2 are included in the network buffer. This is because reaching Nodes 1 and 2 from Node 3 incurs a cost of 3, meaning that an additional cost of 1 may be incurred to reach the offset cost of 4. Thus, 1/7 (0.14) of Link 1, which has a total cost of 7, is included in the network buffer. Likewise 0.25 of Link 2, which has a total cost of 4, is included in the network buffer.

An output logic 243 outputs, for subsequent analysis, the buffer coverage and the respective costs associated with the respective buffer network elements in the buffer coverage. In the example shown in FIG. 2, the buffer coverage and respective costs are provided in the form of a node buffer table 255 and a link buffer table 257. In the link table 257, a start and end point for the link are stored to indicate whether the entire link or a portion of the link is included in the network buffer 150. It is to be appreciated that the buffer coverage and cost may be provided in any suitable manner that facilitates processing queries on the network buffer data.

The system 200 may also include a query logic 270 that receives queries on the network buffer 250 and returns results from the network buffer. Some example queries will be discussed below with respect to FIGS. 4 and 5. Because buffer coverage is represented as a set of network elements, set operations such as intersection, union, subtraction, and so on may be performed in a straight forward manner. Further, union and intersection operations may also be performed at least two network buffers having the same offset cost and different center network elements.

A union operation may be performed on at least two network buffers by performing a union on the buffer coverage for the at least two network buffers and associating a respective cost with buffer network elements in the union. The cost for a buffer network element in the union is selected as a minimum cost associated with travelling between the buffer network element and the center network elements of the at least two network buffers on a path constrained to buffer network elements. The resulting network buffer will have the same offset cost as the at least two network buffers. An intersection operation may be performed on at least two network buffers having the same offset cost and different center network elements by performing an intersection operation on the buffer coverage for the at least two network buffers. A respective cost is associated with each buffer network element in the intersection that corresponds to a minimum cost associated with travelling between the buffer network element and the center network elements of the at least two network buffers on a path constrained to buffer network elements. The resulting network buffer will have the same offset cost as the at least two network buffers.

Other operations that can be performed on buffers include determining a sub-buffer of a network buffer by generating a network buffer with the same center but with a smaller offset cost. Likewise, a super-buffer can be determined for a network buffer by augmenting the network buffer with network elements that have a larger offset cost and determining the cost of the additional network elements with respect to the center network element.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
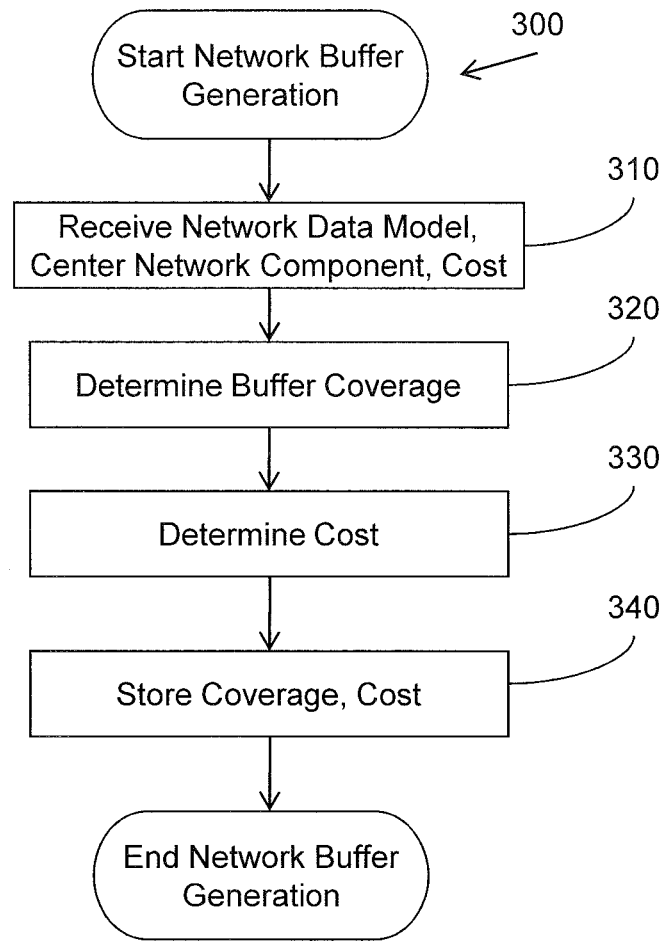
FIG. 3 illustrates an example embodiment of a method associated with generating a network buffer.

FIG. 3 illustrates an example embodiment of a method 300 that generates a network buffer. At 310, a network data model, a center network element, and an offset cost are received. At 320, a buffer coverage that includes a set of buffer network elements located within the offset cost with respect to the center network element is determined. At 330, a respective cost associated with travelling a path with minimum cost from the buffer center(s) to the corresponding network element. Because the analysis is performed on a network model, the path is constrained to buffer network elements. At 340, the buffer coverage and respective costs are stored for subsequent analysis.

While FIG. 3 illustrates various actions occurring in serial, it is to be appreciated that various actions illustrated in FIG. 3 could occur substantially in parallel. By way of illustration, a first process could receive a network data model, a center network element, and an offset cost, a second process could determine buffer coverage, and a third process could determine costs. While three processes are described, it is to be appreciated that a greater and/or lesser number of processes could be employed and that lightweight processes, regular processes, threads, and other approaches could be employed.

Figure 4A:
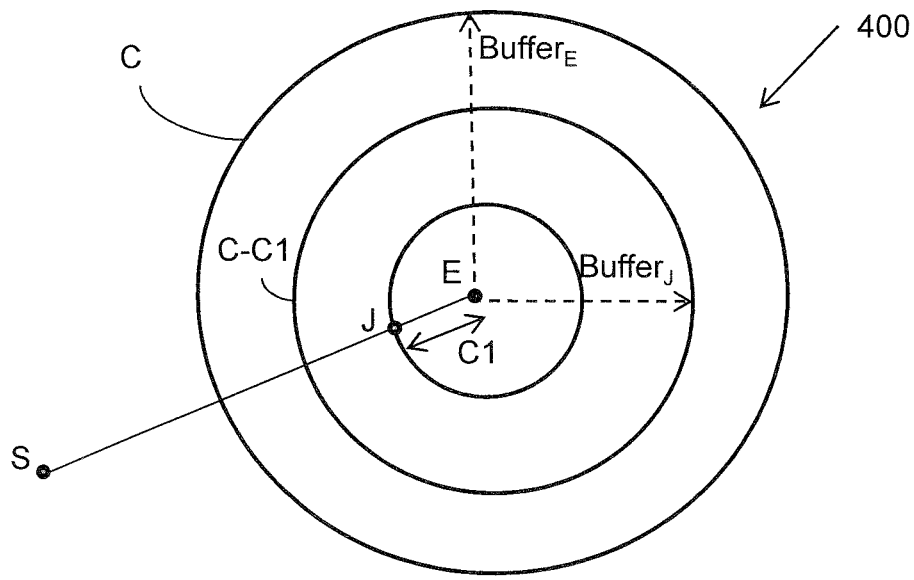
FIGS. 4A and 4B illustrate an example embodiment of a method associated with generating a network buffer.

FIG. 4A illustrates an example embodiment of deriving a network buffer 400 for a point on a link from the network buffer for the link's end nodes. This may be employed, for example, to provide results to a query from a user traveling along a link (road) who wants to know what restaurants are located within 3 miles of their present location. While a network buffer may not be stored for their precise location, a network buffer that includes the link or an endpoint of the link on which they are located may be. FIG. 4A is a schematic 400 that illustrates the link as starting at node S and ending at node E. The point of interest is indicated as J. A network buffer for endpoint E, Buffer$_E$, has already been stored. Buffer$_E$ has a center network element of Node E and an offset cost of C. A network buffer for J, Buffer$_J$, may be derived from the stored network buffer Buffer$_E$ to facilitate responding to the user's query.

Figure 4B:
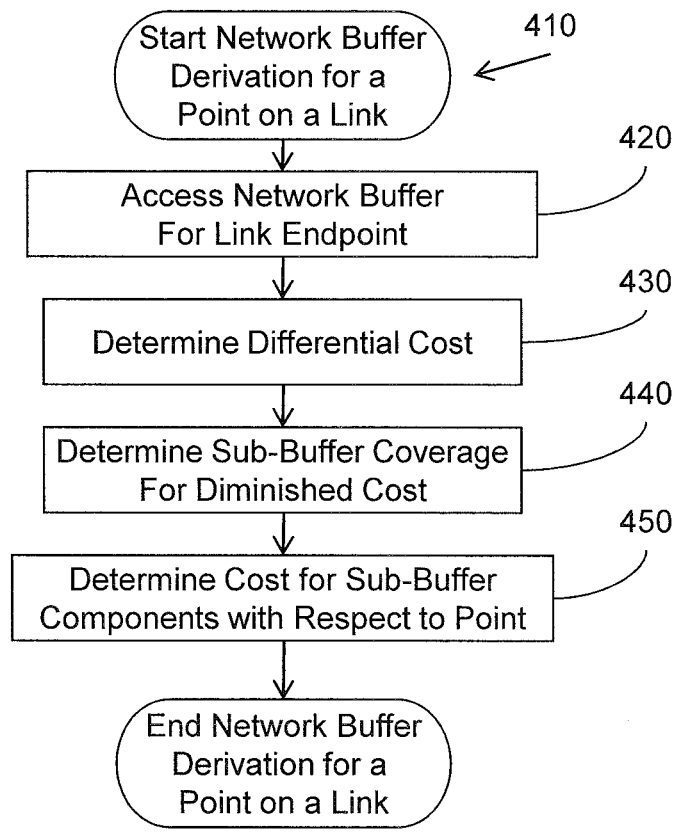

FIG. 4B illustrates an example embodiment of a method 410 that derives the network buffer for a point on a link. At 420, a network buffer for an endpoint of the link is accessed. At 430, a differential cost between the point and the endpoint is determined. In FIG. 4A, this cost is determined to be C1. At 440, sub-buffer coverage is determined for the network buffer Buffer$_E$ for the cost of E as diminished by the differential cost C1. In FIG. 4A, this sub-buffer coverage is indicated by the region enclosed by the circle "C-C1.". At 450, a cost for the sub-buffer network elements within this region with respect to the point is determined. The cost for the sub-buffer network elements may be determined as the original buffer cost of the element diminished by the differential cost between the point and the end point plus the cost from end point to the center. The resulting sub-buffer identifies network elements within the given offset cost to the point of interest as well as the actual cost that would incurred to travel to any one network elements.

Figure 5A:
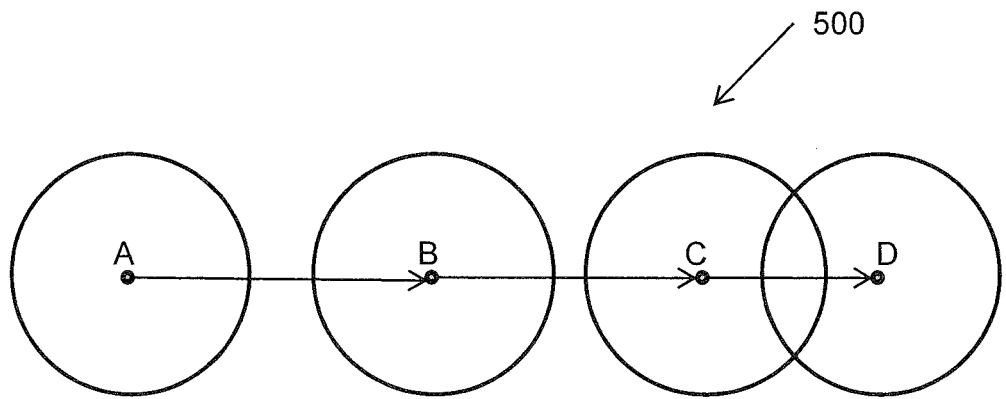
FIGS. 5A and 5B illustrate another example embodiment of a method associated with generating a network buffer.

FIG. 5A illustrates an example embodiment of a network buffer 500 for a path that connects at least two nodes A and D along links within a network. For example, a user may want to know what grocery stores are located within 5 minutes of the path between his house located in network buffer with center A and a friend's house located in network buffer D. The network buffer 500 may be derived from individual network buffers having center network elements Node A, Node B, Node C, and Node D, all of which lie on the path between the user and his friend. The user may also want to know which of the grocery stores is least out of his way, thus it would be useful to know the cost (travel time) from the path to each grocery store.

Figure 5B:
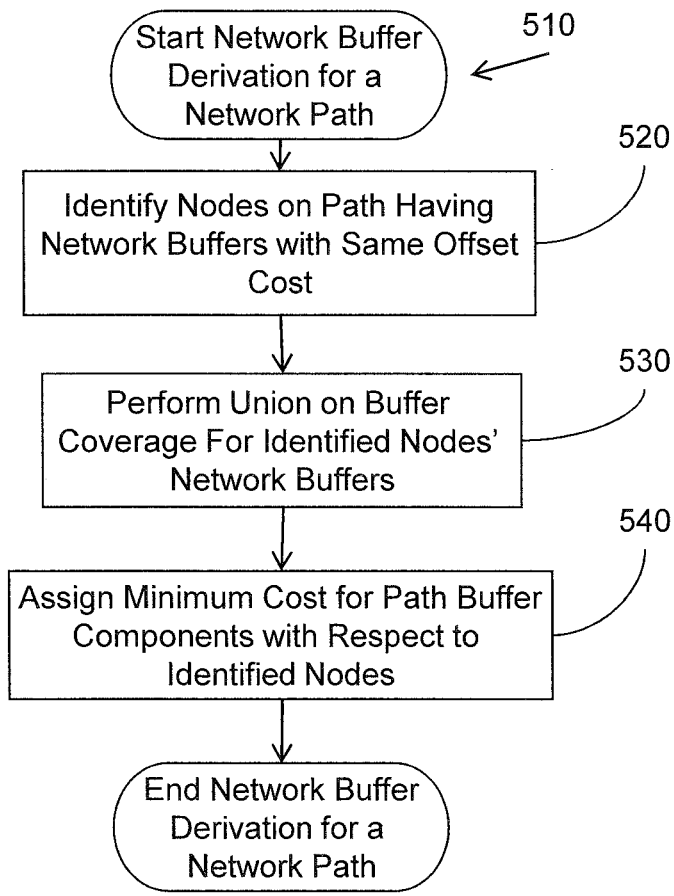

FIG. 5B illustrates an example embodiment of a method 510 that derives a network buffer for a network path. At 520, nodes along the path having network buffers with the desired offset cost (travel time) are identified. Of course, as already discussed, a network buffer for any of the nodes with a different offset cost may be modified using the super-buffer or sub-buffer operations to provide a network buffer with the desired offset cost. At 530, a union operation is performed on the buffer coverage for the identified network buffers. At 540, a minimum cost for these path buffer elements is determined with respect to all of the center network elements and this minimum cost is assigned to the path buffer elements. Thus, not only the identity of the elements within the desired offset cost is provided by the path buffer, but also the cost to reach the individual path buffer elements.

Network buffers can be stored and queried at a later time. Network buffers may also be used together with stored POI information to answer queries like "What are the POIs within a given cost, ordered by cost?". This allows for the pre-computation and storage of network buffers of desired cost centered at major locations such as highway exits, hospitals, and so on. By preprocessing and storing network buffers for some POIs, a range query on the stored network buffers can be used to easily determine which POIs are nearby a given location on the network. Thus, in many cases having stored network buffers eliminates the need to perform a network analysis each time a user's location changes.

As more analysis is performed, network buffers with a larger offset cost may be merged with network buffers having the same center network element but a smaller offset cost. In this case, reachable and reaching coverage should be treated separately. To quickly determine if one or more POIs (expressed as a link identifier and a percentage of travel along the link) are located within a given network buffer, a join may be performed on the POI link identifiers and the network buffer. POIs may also be analyzed by performing coverage and cost analysis for a base node near the POI and then adding the cost of travelling to the POI from the base node.

In one example, methods described herein may be implemented as computer executable instructions. Thus, in one example, a computer-readable medium may store computer executable instructions that if executed by a machine (e.g., processor) cause the machine to perform a method that includes receiving a network data model and generating a network buffer. A center network element around which to generate the network buffer may be selected, for example, in response to a user query. An offset cost to define a boundary of the network buffer may be selected, for example, in response to a user query. A buffer coverage including a set of buffer network elements located within the offset cost with respect to the center network element is determined. A respective cost associated with travelling between respective buffer network elements and the center network element on a path constrained to buffer network element is also determined. The buffer coverage and the respective costs associated with the respective buffer network elements in the buffer coverage are stored for subsequent analysis.

While executable instructions associated with the above method are described as being stored on a computer-readable medium, it is to be appreciated that executable instructions associated with other example methods described herein may also be stored on a computer-readable medium.

Figure 6:
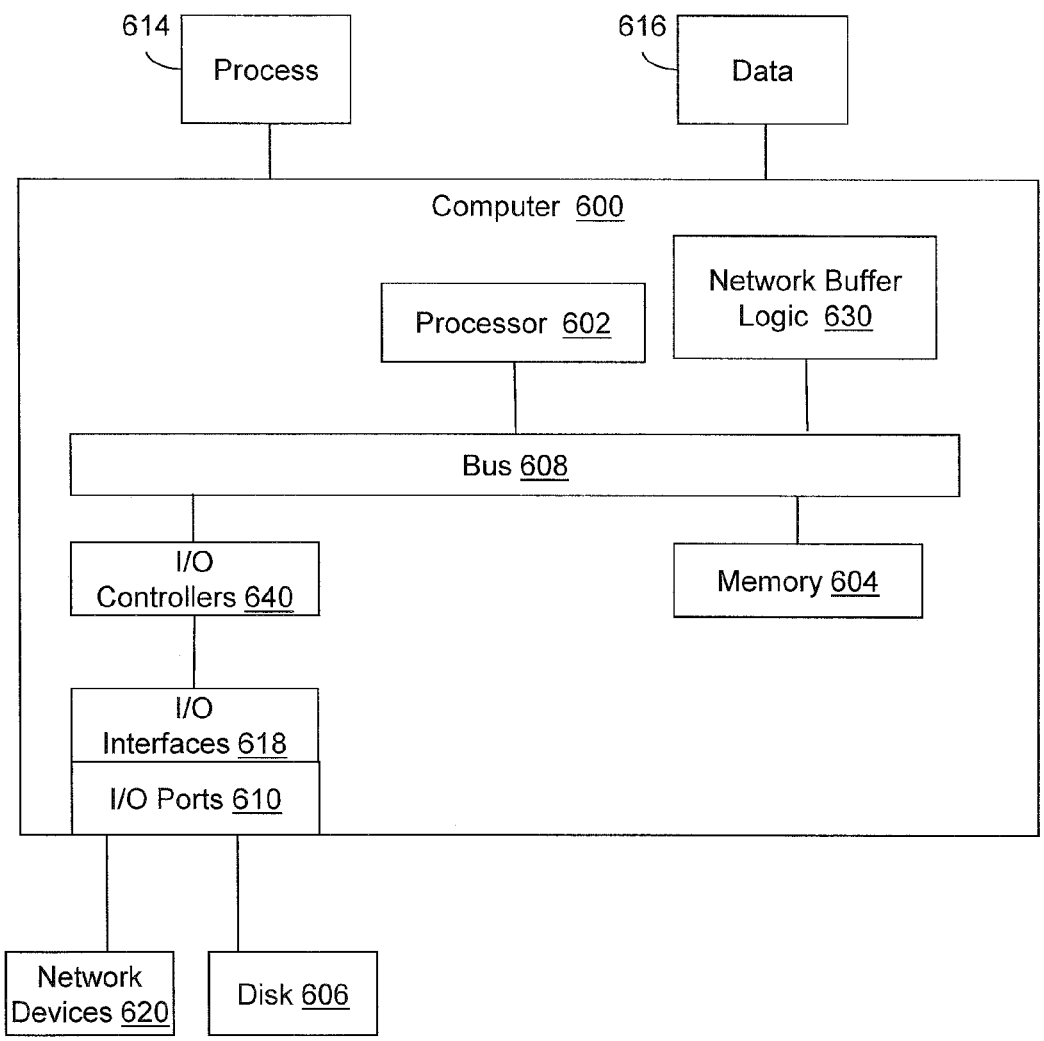
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a network logic 630 configured to facilitate generating a network buffer. In different examples, the logic 630 may be implemented in hardware, software stored as computer executable instructions on a computer-readable medium, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, firmware) for inputting a network data model that includes a set of network elements and respective costs associated with respective network elements, where the network elements comprise nodes and links between nodes, a center network element around which to generate the network buffer, and an offset cost to define a boundary of the network buffer.

Logic 630 may also provide means (e.g., hardware, firmware) for means for generating a network buffer by determining a buffer coverage comprising a set of buffer network elements located within the offset cost with respect to the center network element; and determining a respective cost associated with travelling between respective buffer network elements and the center network element on a path constrained to buffer network elements. Logic 630 may also provide means for outputting, for subsequent analysis, the buffer coverage and the respective costs associated with the respective buffer network elements in the buffer coverage. The means may be implemented, for example, as an ASIC (application specific integrated circuit) programmed to perform fragment matching. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM (compact disk) drive, a CD-R (CD recordable) drive, a CD-RW (CD rewriteable) drive, a DVD (digital versatile disk and/or digital video disk) ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCI (peripheral component interconnect), PCIE (PCI express), 1394, USB (universal serial bus), Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A non-transitory computer-readable medium storing computer executable instructions that when executed by a computer cause the computer to perform a method, the method comprising:
    receiving a network data model comprising a set of network elements and respective costs associated with respective network elements, where the network elements comprise nodes and links between nodes;
    generating a network buffer by:
        selecting a center network element around which to generate the network buffer;
        selecting an offset cost to define a boundary of the network buffer;
        identifying a subset of network elements as buffer network elements that are located within the offset cost with respect to the center network element;
        determining a buffer coverage as the set of buffer network elements located within the offset cost with respect to the center network element; and
        for each buffer network element, determining a respective cost associated with travelling a path with minimum cost from the center network element to a respective buffer network element; and
    storing, for subsequent analysis, the buffer coverage and the respective costs associated with the respective buffer network elements in the buffer coverage.

2. The computer-readable medium of claim 1 where the storing of the buffer coverage and a respective cost is performed by:
    storing, in a node buffer table, an identifier of buffer nodes in the buffer coverage and the respective costs associated with travelling a path with minimum cost from the center network element to the corresponding node; and
    storing, in a link buffer table, an identifier of buffer links in the buffer coverage and respective costs associated with travelling a path with minimum cost from the center network element to the corresponding link.

3. The computer-readable medium of claim 1 where the buffer network data elements further comprise link intervals corresponding to a portion of a link that is located within the offset cost of the center network element.

4. The computer-readable medium of claim 1 where the method comprises performing a union operation on at least two network buffers having the same offset cost and different center network elements by:
    performing a union operation on the buffer coverage for the at least two network buffers; and
    associating a respective cost with buffer network elements in the union corresponding to a minimum cost associated with travelling a path with minimum cost from the center network elements to the corresponding buffer network elements of the at least two network buffers.

5. The computer-readable medium of claim 4 where the method comprises deriving a network path buffer for a network path comprising at least two nodes connected by at least one link by performing a union operation on network buffers having the at least two nodes as center network elements and the same offset cost.

6. The computer-readable medium of claim 1 where the method comprises performing an intersection operation on at least two network buffers having the same offset cost and different center network elements by:
    performing an intersection operation on the buffer coverage for the at least two network buffers; and
    associating a respective cost with buffer network elements in the intersection corresponding to a minimum cost associated with travelling a path with minimum cost from the center network elements to the corresponding buffer network elements of the at least two network buffers.

7. The computer-readable medium of claim 1 where the method comprises deriving a network buffer for a point on a link by:
    accessing a network buffer having an end point of the link as a center network element, where the network buffer has an associated offset cost;
    determining a differential cost spanning between the point on the link and the end point of the link on a path of minimum cost;
    determining a sub-buffer coverage comprising a set of buffer network elements located within the offset cost as diminished by the differential cost with respect to the center network element;

determining a respective sub-buffer cost associated with travelling a path with minimum cost from the end point to the corresponding buffer network element; and storing the sub-buffer coverage and the respective sub-buffer costs associated with the buffer network elements in the sub-buffer coverage.

8. The computer-readable medium claim 1 where the method comprises, in response to a query, performing one or more set operations on buffer coverage for at least two network buffers.

9. The computer-readable medium of claim 1 where the method comprises:

augmenting an existing network buffer coverage with network elements that have a larger offset cost with respect to the center network element; and determining the cost of the additional network elements with respect to the center network element.

10. A computing system, comprising:

a processor;

an input logic configured to cause the processor to:
receive a network data model comprising a set of network elements and respective costs associated with respective network elements, where the network elements comprise nodes and links between nodes,
receive a center network element; and
receive an offset cost defining a boundary of a network buffer;

a network buffer logic configured to cause the processor to generate a network buffer by:
identifying a subset of network elements as buffer network elements that are located within the offset cost with respect to the center network element; and
determining a buffer coverage as the set of buffer network elements located within the offset cost with respect to the center network element; and
for each buffer network element, determining a respective cost associated with travelling a path with minimum cost from the center network element to a respective buffer network element; and an output logic configured to cause the processor to:
output, for subsequent analysis, the buffer coverage and the respective costs associated with the respective buffer network elements in the buffer coverage.

11. The computing system of claim 10 where the output logic outputs:

a node buffer table comprising an identifier of buffer nodes located within the offset cost with respect to the center network element and respective costs associated with travelling a path with minimum cost from the center network element to the corresponding node; and a link buffer table comprising an identifier of buffer links located within the offset cost with respect to the center network element and respective costs associated with travelling a path with minimum cost from the center network element to the corresponding link.

12. The computing system of claim 10 where the buffer network data elements further comprise link intervals corresponding to a portion of a link that is located within the offset cost of the center network element.

13. The computing system of claim 10 where the network buffer logic is configured to derive a network path buffer for a network path comprising at least two nodes connected by at least one link by performing a union operation on network buffers having the at least two nodes as center network elements and the same offset cost.

14. The computing system of claim 10 where the network buffer logic is configured to derive a network buffer for a point on a link by:

accessing a network buffer having an end point of the link as a center network element, where the network buffer has an associated offset cost;

determining a differential cost spanning between the point on the link and the end point;

determining a sub-buffer coverage comprising a set of sub-buffer network elements located within the offset cost as diminished by the differential cost with respect to the center network element;

determining a respective sub-buffer cost associated with associated travelling a path with minimum cost from the end point to the corresponding buffer network element; and storing the sub-buffer coverage and the respective sub-buffer costs associated with the buffer network elements in the sub-buffer coverage.

15. The computing system of claim 10 comprising a query logic that is configured to return network buffer coverage in response to a query.

16. A computer-implemented method comprising, in response to receiving a request to generate a network buffer:

inputting a network data model comprising a set of network elements and respective costs associated with respective network elements, where the network elements comprise nodes and links between nodes, a center network element around which to generate the network buffer, and an offset cost to define a boundary of the network buffer;

generating a network buffer by:
identifying a subset of network elements as buffer network elements that are located within the offset cost with respect to the center network element; and
determining a buffer coverage as the set of buffer network elements located within the offset cost with respect to the center network element; and
for each buffer network element, determining a respective cost associated with travelling a path with minimum cost from the center network element to a respective buffer network element; and outputting, for subsequent analysis, the buffer coverage and the respective costs associated with the respective buffer network elements in the buffer coverage.

17. The computer-implemented method of claim 16 comprising performing a union operation on at least two network buffers having the same offset cost and different center network elements by:

performing a union operation on the buffer coverage for the at least two network buffers; and associating a respective cost with respective buffer network elements in the union corresponding to a minimum cost associated with travelling a path with minimum cost from the center network elements to the corresponding buffer network elements of the at least two network buffers.

18. The computer-implemented method of claim 17 comprising:

receiving a query to return coverage information for a network path;

deriving a network path buffer for a network path comprising at least two nodes connected by at least one link by performing a union operation on network buffers having the at least two nodes as center network elements and the same offset cost; and outputting the derived network path buffer.

19. The computer-implemented method of claim 16 comprising:
- receiving a query to return coverage information for point on a link;
- deriving a network buffer for the point by:
  - accessing a network buffer having an end point of the link as a center network element, where the network buffer has an associated offset cost;
  - determining a differential cost spanning between the point and the end point;
  - determining a sub-buffer coverage comprising a set of sub-buffer network elements located within the offset cost as diminished by the differential cost with respect to the center network element;
  - determining a respective sub-buffer cost associated travelling a path with minimum cost from the end point to the corresponding buffer network element; and
- outputting the sub-buffer coverage and the respective sub-buffer costs associated with the sub-buffer network elements in the sub-buffer coverage.

20. The computer-readable medium of claim 1, where the buffer coverage comprises the set of buffer network elements such that network elements located beyond the offset cost with respect to the center network element are not included in the buffer coverage.

* * * * *

UNITED STATES PATENT AND TRADEMARK OFFICE
CERTIFICATE OF CORRECTION

| | | |
|---|---|---|
| PATENT NO. | : 8,605,608 B2 | Page 1 of 1 |
| APPLICATION NO. | : 12/687188 | |
| DATED | : December 10, 2013 | |
| INVENTOR(S) | : Wang et al. | |

It is certified that error appears in the above-identified patent and that said Letters Patent is hereby corrected as shown below:

In the Specification

In column 6, line 63, delete ""C-C1."." and insert -- C-C1". --, therefor.

In the Claims

In column 11, line 7, in Claim 8, delete "medium claim" and insert -- medium of claim --, therefor.

Signed and Sealed this
Fifteenth Day of July, 2014

Michelle K. Lee
*Deputy Director of the United States Patent and Trademark Office*